(12) United States Patent  
Kempainen et al.

(10) Patent No.: US 9,261,419 B2
(45) Date of Patent: Feb. 16, 2016

(54) MODULAR LOAD STRUCTURE ASSEMBLY HAVING INTERNAL STRAIN GAGED SENSING

(71) Applicant: Honeywell International Inc., Morristown, NJ (US)

(72) Inventors: Alan J. Kempainen, Ostrander, OH (US); Andrew Kelly, Columbus, OH (US)

(73) Assignee: Honeywell International Inc., Morris Plains, NJ (US)

( * ) Notice: Subject to any disclaimer, the term of this patent is extended or adjusted under 35 U.S.C. 154(b) by 33 days.

(21) Appl. No.: 14/161,753

(22) Filed: Jan. 23, 2014

(65) Prior Publication Data

US 2015/0204738 A1    Jul. 23, 2015

(51) Int. Cl.
*G01L 1/22* (2006.01)
*G01G 3/14* (2006.01)
*G01L 5/10* (2006.01)

(52) U.S. Cl.
CPC ............... *G01L 1/22* (2013.01); *G01G 3/1402* (2013.01); *G01L 1/2218* (2013.01); *G01L 5/103* (2013.01)

(58) Field of Classification Search
CPC ............ G01L 5/103; G01R 1/30; G01N 3/08; G01M 5/00
USPC .................. 73/862.76, 856, 862.041–862.046
See application file for complete search history.

(56) References Cited

U.S. PATENT DOCUMENTS

| 3,695,096 A | 10/1972 | Kutsay |
| 3,841,150 A | 10/1974 | Pearson |
| 3,956,927 A | 5/1976 | Pearson |
| 4,576,053 A | 3/1986 | Hatamura |
| 4,858,475 A | 8/1989 | Jacobson et al. |
| 5,391,934 A | 2/1995 | Feldman |
| 5,798,463 A * | 8/1998 | Doudican ............... G01N 3/08 73/789 |
| 6,006,602 A | 12/1999 | Preston et al. |
| 6,126,785 A | 10/2000 | Hu et al. |

(Continued)

FOREIGN PATENT DOCUMENTS

| DE | 102007012157 | 9/2008 |
| WO | 9839580 | 9/1998 |
| WO | 0191522 | 11/2001 |

OTHER PUBLICATIONS

Invitation to Pay Additional Fees and, Where Applicable, Protest Fee, for Corresponding PCT Application No. PCT/US2015/011340, dated Jun. 2015.

*Primary Examiner* — Max Noori
(74) *Attorney, Agent, or Firm* — Conley Rose, P.C.; Kristin Jordan Harkins (57) ABSTRACT

A modular assembly for measuring forces on a structure. The structure may contain a strain gage module that is insertable in a cavity or hole in the structure. There may be numerous structures that can contain a strain gage module. These structures may have various configurations, sizes, and shapes. Despite the various configurations, sizes and shapes, the structures may have cavities or holes of the same size that accept strain gage modules of the same size. Modules of the same size may be easier and less expensive by being produced in multiple quantities, than modules of various sizes. An electronics module may be attached to or separate from the structure. Electronics modules may also be the same items for various structures and be produced in multiple quantities. One example application of the structure may be a strain gage instrumented load pin replacing a standard connecting pin.

19 Claims, 4 Drawing Sheets

(56) References Cited

U.S. PATENT DOCUMENTS

| | | |
|---|---|---|
| 6,745,627 B1 | 6/2004 | Woodruff et al. |
| 6,891,498 B2 | 5/2005 | Jacobs et al. |
| 6,910,379 B2 | 6/2005 | Eskridge et al. |
| 6,952,042 B2 | 10/2005 | Stratton et al. |
| 6,983,658 B2 | 1/2006 | Wenski |
| 7,155,334 B1 | 12/2006 | Stewart et al. |
| 7,441,464 B2 | 10/2008 | Turnbull et al. |
| 7,451,664 B1 | 11/2008 | Hanlon et al. |
| 7,644,636 B2 | 1/2010 | Gregory et al. |
| 7,647,837 B2 | 1/2010 | Moran et al. |
| 7,698,951 B2 | 4/2010 | Brown et al. |
| 7,703,776 B1 | 4/2010 | Nugent |
| 7,726,197 B2 | 6/2010 | Selvan et al. |
| 7,775,123 B2 | 8/2010 | Ngo |
| 8,060,296 B2 | 11/2011 | Vetsch |
| 8,833,176 B1 * | 9/2014 | Shapiro .................. G01L 5/103 73/828 |
| 2005/0075846 A1 * | 4/2005 | Kim .................................. 703/1 |
| 2007/0051067 A1 * | 3/2007 | Wall ............................. 52/731.2 |
| 2007/0144269 A1 | 6/2007 | Novack |
| 2007/0180921 A1 | 8/2007 | Gaines |
| 2008/0167663 A1 * | 7/2008 | De Mathelin et al. ........ 606/130 |
| 2008/0214961 A1 * | 9/2008 | Matsumoto ........ A61B 5/02007 600/587 |
| 2009/0121399 A1 | 5/2009 | Hindle et al. |
| 2009/0183561 A1 | 7/2009 | Gregory et al. |
| 2009/0210173 A1 * | 8/2009 | Arms et al. ..................... 702/42 |
| 2009/0319189 A1 | 12/2009 | Cornett et al. |
| 2011/0000318 A1 | 1/2011 | Bradley et al. |
| 2011/0202291 A1 | 8/2011 | Hickman |
| 2013/0250278 A1 * | 9/2013 | Zhao .................... G01B 11/162 356/35.5 |

\* cited by examiner

MODULAR LOAD STRUCTURE ASSEMBLY HAVING INTERNAL STRAIN GAGED SENSING

BACKGROUND

The present disclosure pertains to sensors and particularly to strain sensors. More particularly, the disclosure pertains to assemblies that may be used for any general application where a measured quantity (e.g., pressure) can be converted into a deflection.

SUMMARY

The disclosure reveals a modular assembly for measuring loads on a structure. The structure may contain a strain gage module that is insertable in a cavity or hole in the structure. Structures may have various configurations and shapes as at least partially dictated by a specific use of the structures. Despite the different configurations, sizes and shapes, the various structures may have a similar cavity or hole such that strain gage modules having the same external dimensions that fit in the cavity or hole of the various structures. Because of these similar dimensions, strain gage modules of the same size may be produced in multiple quantities, thus resulting in competitive production costs.

Electronics modules may be connected to strain gage modules. Electronics modules may also be the same for strain gage modules and be produced in multiple quantities. One example application of a strain gage module may be an instrumented load pin replacing a standard connecting pin in a joint to give force/load feedback.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. One example may be an instrumented load pin replacing a standard connecting pin in a joint to give force/load feedback. There may be numerous other examples or ways of implementing the system and approach.

The system and approach may enable a line of load pin products that are easy to manufacture and have a modular strain gaged device that can be inserted and sealed inside the outer pin (inside a central axial hole) for durability and environmental sealing. Some load pins may be down-hole gaged where strain gages are placed inside the bore of a central axial hole. A down-hole design may result in low yield and be difficult to manufacture. Additionally, with such a design, different capacities may require different hole sizes and pin sizes in that stocking strain gaged elements may be an issue. Customers may prefer a downhole load pin with no external covers/gages to get damaged and provides a perception of being very rugged.

The internal strain gage module may be strain gaged on the work bench (i.e., manufactured easily) and then inserted into the easily machined structure. The present structure may have an insertable strain gaged module. One strain gage module could be used on multiple sizes and capacities of structures making manufacturing, stocking and supply of the product line cost effective and inventory friendly for the manufacturer.

In addition to a customer's perception noted, some load pins may need a different strain gaged element for each size and/or capacity. In the present mechanism, there may be several different outer geometries (load pin diameters for different sizes/capacities) but there may be one or very few simple strain gaged elements that can be built up ahead of time and inserted into the load pins for use. One may end up with strain gaged internal elements that can be inserted into multiple size "sleeves" (e.g., cartridges) for different load pin diameters/capacities. This approach may be extended to having a sealed gaged device that can be inserted into multiple load pins by the customer to have the advantage to buy one size unit (i.e., strain gaged element) and be able to insert it into multiple sleeves as the customer sees appropriate. The inserted strain gage module may be inexpensive to machine and easily strain gaged for maximum yields and manufacturability.

Figure 1:
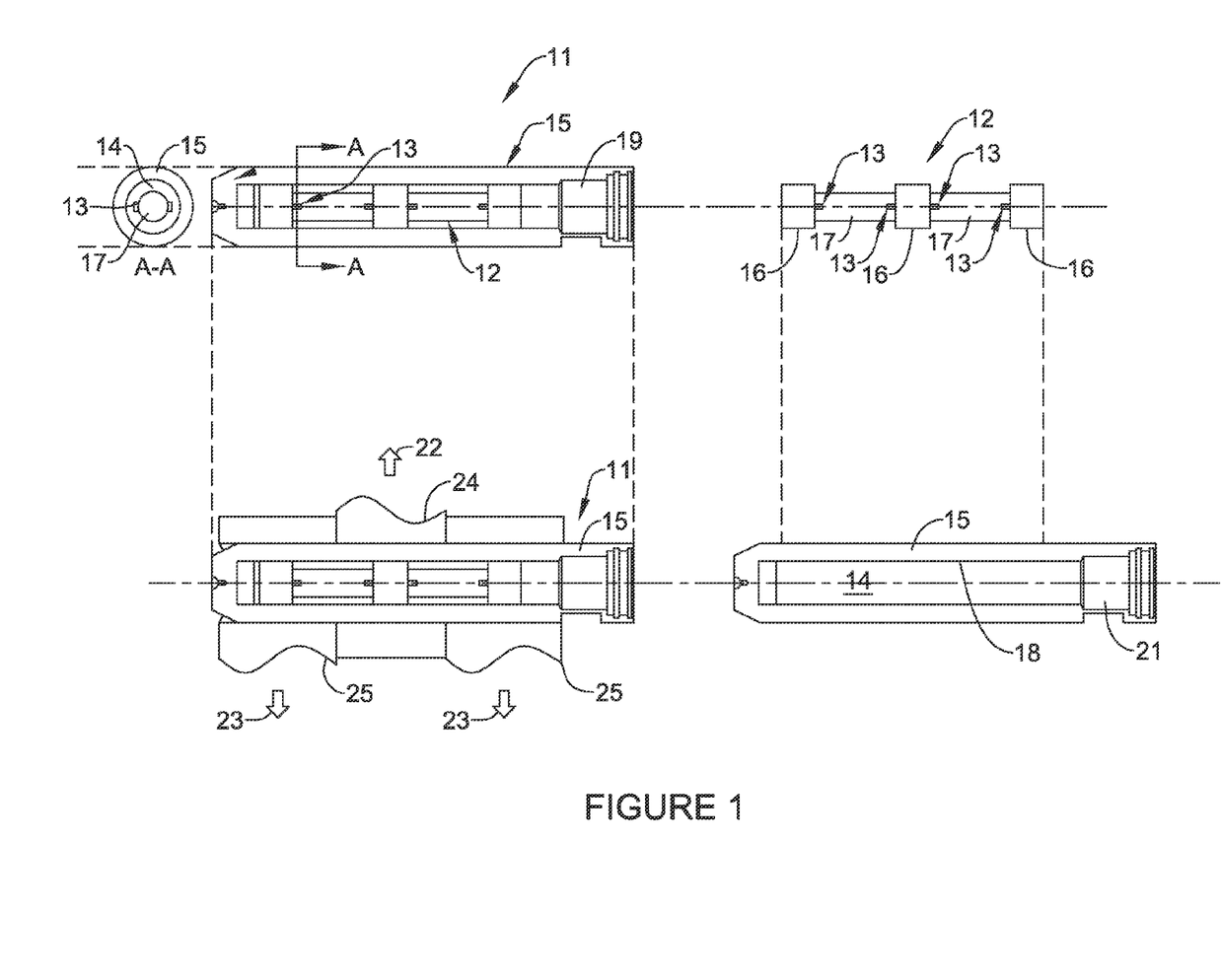
FIG. 1 is a diagram of an illustrative example of a modular assembly for load measurements with a pin.

The present load pin may be a modular, universal pin. An internal modular piece that is strain gaged may have multiple configurations. FIG. 1 shows an internal module as a bending beam device but could be a shear device as well. The modular piece or module may be inserted into much less expensive sleeves which are made up ahead of time. The module may be analyzed to give the correct output when inserted in the sleeves. The internal module may also contain electronics (amplifier, ASIC, and so forth) to be fully interchangeable by a customer in different outer sleeves. The module may also be completely internal in that the customer does not see it. The internal module may be attached to the sleeve via welding, inserted into a tightly toleranced hole, or other mechanism, depending on the customer's needs and performance requirements of the customer's system. The present mechanism may be used on lifting devices, agricultural tractor hitch control systems, payload monitoring systems, structural joint load monitoring, coil tubing injector systems, deadline anchor systems, cranes, off-road equipment, mooring/hoisting systems, and other systems with two or more structures joined together.

Four strain gages may be arranged on bending beams, such that two strain gages sense tension and the other two sense compression. Other strain configurations may be implemented.

The bending beams may be part of a separate sensing assembly/strain gage module that is inserted down the center of the load pin. Several approaches may used for measuring strain in a pin in bending. One may be using "shear" strain gages bonded to the inside diameter of the pin or structure. The other may be using "shear" strain gages bonded to curved or flat surfaces on the outside surfaces of the pin.

The use of a sensing assembly is not necessarily limited to load pins or pin-shaped parts. The assembly may be used anywhere there is a straight hole. For example, it may be possible to retrofit a customer's equipment with the present sensing assembly if the structural deformations are noted and accommodating the sensing assembly does not compromise the structural integrity of the equipment.

FIG. 1 is a diagram of an illustrative load pin assembly 11 having a structure 15 (e.g., sleeve) and an internal strain gage or sensing module 12. Module 12 may have one or more strain gages 13. Module 12 may be put into a hole or cavity 14 of an outer sleeve or structure 15 of assembly 11. Module 12 may be pressed in with a tight fit inside of structure 15. Module 12 may instead be welded, have set screws, or glued in cavity 14. Module 12 may be secured in cavity 14 with virtually any approach or mechanism so that a force exerted on structure 15 is transferred to module 12 and affects strain gages 13.

Figure 2:
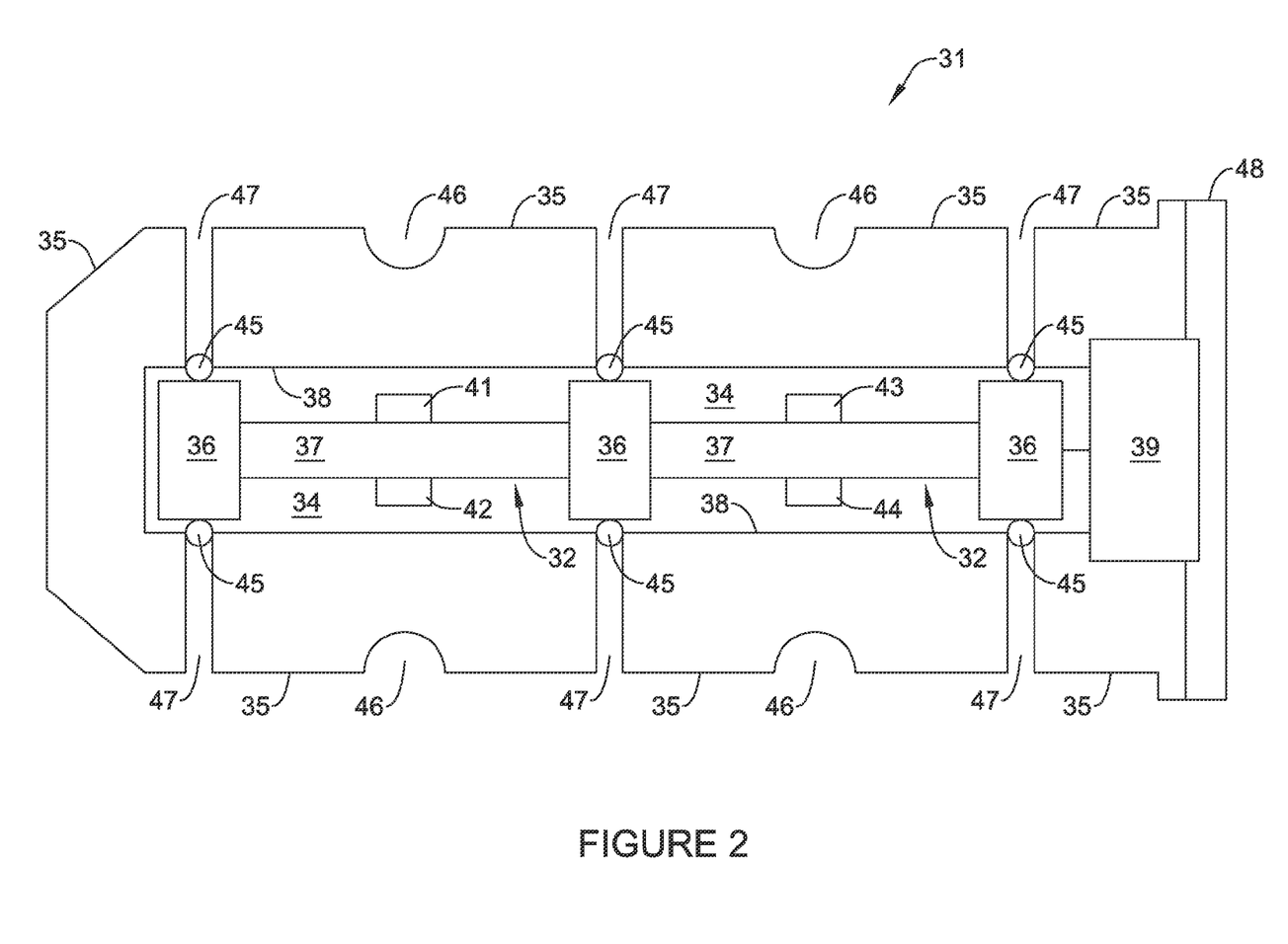
FIG. 2 is a diagram of another modular assembly for measurements with a structure.

Module 12 may have portions 16 that are larger than portions 17 in terms of diameter or thickness. Portions 16 may have good mechanical contact with inside wall 18 of structure 15 in that any deformation of structure 15 can cause a deformation of module 12. Portions 17 may be deformed in a manner that affects the one or more strain gages 13 on portions 17. The deformation effect on a strain gage 13 of module 12 may result in a change in electrical resistance of gage 13. The one or more strain gages may be connected to an electronics module 19 which may be placed in a space 21 of structure 15. Electronics module 19 may instead be remote from structure 15, with a wire or wireless connection to strain gage or gages 13. The resistances of gages 13 may be deciphered by an electronics module 19 into an indication of an amount or magnitude of load or force exerted on structure 15 of assembly 11. Forces 22 and 23 may exert a bending deformation on structure 15 via components 24 and 25, respectfully, in contact with structure 15. These forces 22 and 23, as shown herein, may be measured via the deformation from structure 15 to sensing module 12 in view of altered resistances from deformation of sensing gage or gages 13 conveyed to electronics module 19 (FIG. 1) or 39 (FIG. 2). An output of electronics module 19 may indicate the amount of force exerted on structure 15 in terms of appropriate units, such as voltage, or current, which has a known relationship with the measured quantity.

Advanced electronics module 19 or 39 is not necessarily required to make the strain gage module work. The module may have an unamplified Wheatstone bridge providing a mV/V output. Electronics may be added internally or externally to the strain gage module structure to give higher level signals (e.g., in terms of volts, milliamps, digital or other protocols, and so forth).

Module 12 may be one of many different designs and/or concepts. Structure 15 may be one of many different shapes and/or configurations. Hole or cavity 14 may be one of many different shapes and/or configurations with module 12 designed to fit and be secured in cavity 14.

FIG. 2 is a diagram of a cutaway view of a load sensing assembly 31. Assembly 31 may be a pin, a bar, or have some other structural shape or design as appropriate for or desired by a user.

Assembly 31 may have a structure 35 and an internal strain gage or sensing module 32. Module 32 may have one or more strain gages, such as, for example, gages 41, 42, 43 and 44. Module 32 may be inserted in a hole or cavity 34 of outer sleeve or structure 35 of assembly 31. Module 32 may be pressed in with a tight fit within a cavity 34 inside of structure 35, having contact with an inside surface 38 of structure 35. Module 32 may instead have welds, glue, or set screws 45 to hold sensing module 32 securely in cavity 34. Welds, set screws or other securing items 45 may be utilized via keyholes 47 to hold module 32 in place relative to structure 35. Module 32 may be secured in cavity 34 with virtually any other effective approach or mechanism so that a force exerted on structure 35 is transferred to module 32 and affects strain gages 41, 42, 43 and/or 44.

Module 32 may have portions 36 that are larger than portions 37 in terms of diameters or thicknesses such that portions 36 provide module 32 support within cavity 34. Portions 36 may have good mechanical contact with inside wall 38 of structure 35 in that any deformation of structure 35 can cause a deformation of module 32. Portions 37 may be deformed in a manner that affects the one or more strain gages 41, 42, 43 and/or 44. The deformation effect on a strain gage 41, 42, 43 or 44 of module 32 may result in a change in electrical resistance of the respective gage. The one or more gages 41, 42, 43 and/or 44 may be connected to an electronics module 39. Electronics module 39 may be in structure 35 or may instead be remote from structure 35 with a wire or wireless connection to strain gage or gages 41, 42, 43 and/or 44. The resistances of gages 41-44 may be deciphered by electronics module 39 into an indication of amount of magnitude of load or force exerted on structure 35 of assembly 31.

One or more grooves 46 may be machined on the external surface of structure 35 in order to create independent load locations. Also, grooves 46 may be machined in structure 35 to minimize stress concentration at the groove locations which in turn can rescue peak stress at those locations. The locations and shapes of grooves 46 may be different from those shown for assembly 31 in FIG. 2.

After module 32 is placed in cavity 34 of structure 35, and secured in place, electronics module 39 may be connected to gages 41-44 and placed at a back end of structure 35 or left out for an external connection. In either case, a cap 48 may be welded, screwed, glued, or fastened in some fashion on the back end of structure 35.

Figure 3:
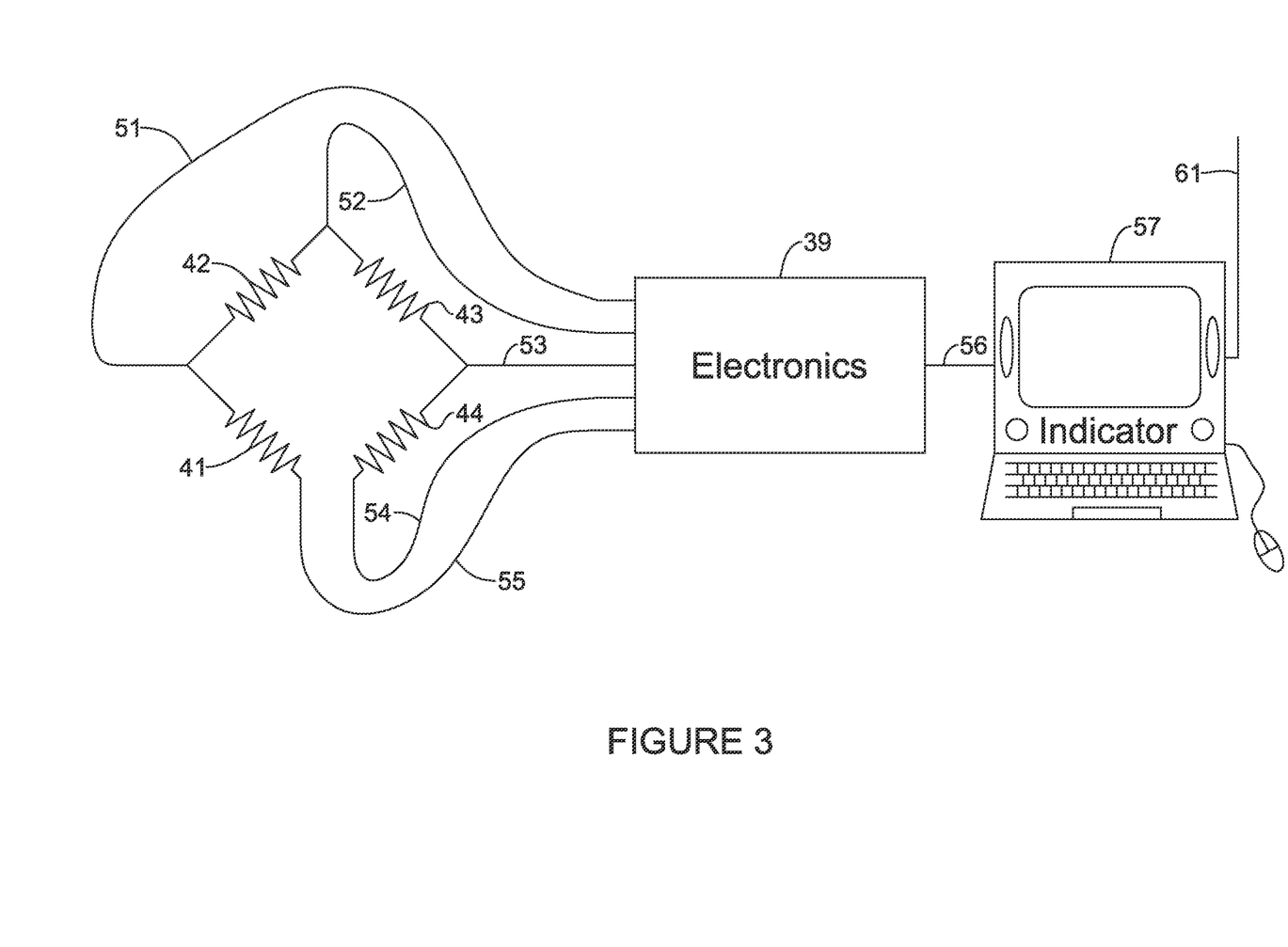
FIG. 3 is a diagram of example electronics associated with the modular assemblies.

FIG. 3 is a diagram of an example hook-up of gages 41-44, represented as resistances that vary with strain on the gages. The gages may be connected in a manner that amplifies their combined effects. Gages may be shown as connected in series with in a form of a Wheatstone bridge with a line 51 at a junction of gages 41 and 42, a line 52 at a junction of gages 42 and 43, and a line 53 at a junction of gages 43 and 44 may go to electronics module 39. The other ends of gages 41 and 44 which may often be connected as a junction of a Wheatstone bridge may go separately as lines 54 and 55 to electronics module 39. Other circuit configurations may be used to connect gages 41-44 with module 39. Scaling, trimming and compensation of the resistive values of gages 41-44 may be achieved by electronics module 39. There may be more or less strain gages in module 32 (FIG. 2). Other processing may also be provided by module 39.

An output 56 of electronics module 39 may go to an indicator 57 to reveal information about a load on assembly 31.

Indicator 57 may have a screen, speaker and a keyboard for a user interface. Indicator 57 may have an input/output line 61 for communication outside of the load assembly, such as with networks, RF systems, and so on. Indicator 57 may display forces and force-related information applied to structure 35 in terms of numerical values, graphs, sound tones, and other visual and audio techniques. Indicator 57 may also provide force and related information by audio. Indicator 57 and electronics module 39 may be connected to a network, and other media.

Figure 4:
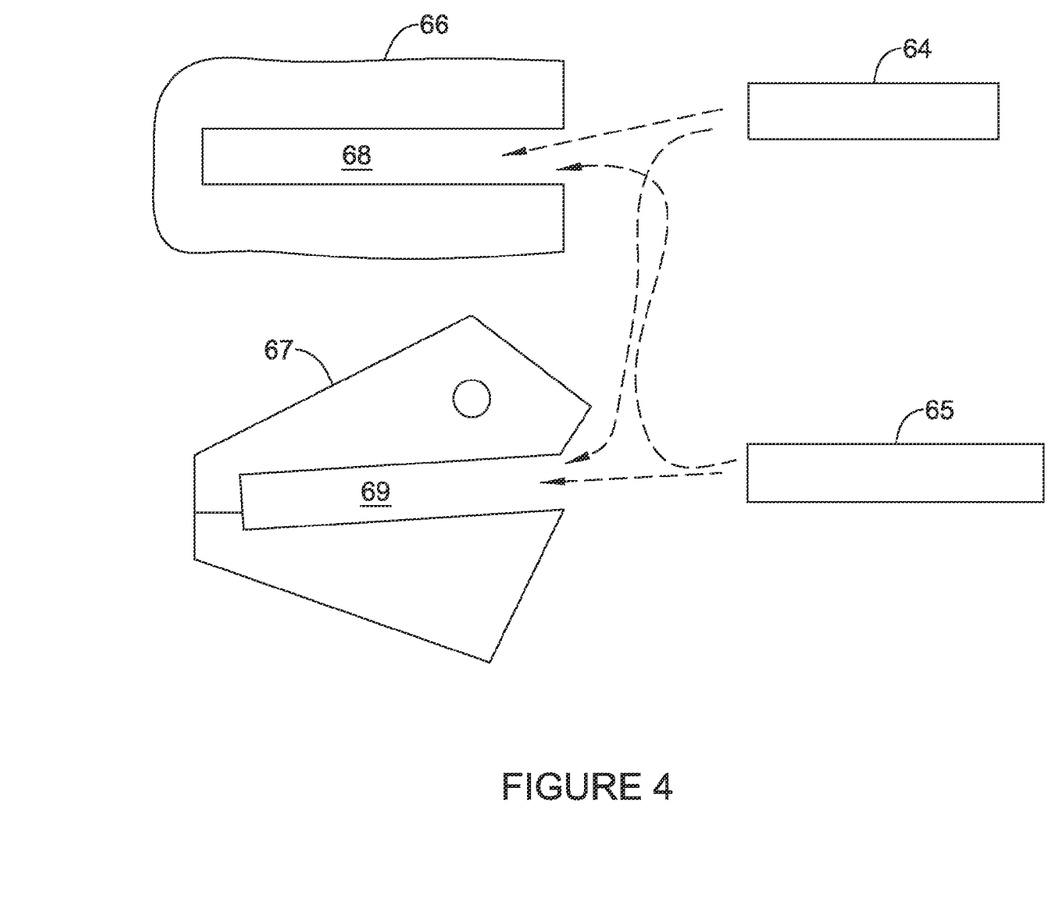
FIG. 4 is a diagram of an illustrative example of different kinds of structures having the same size cavities or holes for acceptance of one external size strain gage sensors or modules.

FIG. 4 is a diagram of an illustrative example of different kinds of structures 66 and 67 having about the same size cavities or holes 68 and 69, respectively, for acceptance and securing of one-size (e.g., cross-section dimensions or diameter) strain gage sensor modules 64 and 65. Module 64 may fit in structures 66 and 67, or other compatible structures. Module 65 may fit in structures 66 and 67, or other compatible structures. Modules 64 and 65 may be sensing modules 12 (FIG. 1) or sleeve-like or load-pin structures 15 having a sensing module 12 inside.

The fit of modules 64 and 65 may be such that forces on the structures can be transferred to the sensor modules situated, respectively, in the cavities or holes of the structures. A single structure may have more than one cavity or hole for holding one or more sensor modules, perhaps at disparate positions in the structure, for example, so as to detect various forces acting on different portions of the structure.

To recap, a modular apparatus having internal load sensing, may incorporate one or more sensing modules having external surfaces with certain cross-section dimensions that are the same, and having one or more strain gages. The apparatus may also incorporate one or more structures where each structure contains one or more cavities having internal surfaces with the certain cross-section dimensions to contain and hold the one or more sensing modules. Each structure of the one or more structures may hold the one or more sensing modules in the cavity in a manner that permits effects of a force applied on the structure to be transferred to the strain gages or other instrumentation mounted to the one or more sensing modules. The force applied on a structure may be detected by the one or more strain gages of the sensing module held by the structure. The one or more strain gages may have an electrical resistance that changes with a variation of a magnitude of the force applied to the structure.

The one or more structures may belong to one or more customers of a provider of the one or more sensing modules for insertion in the one or more cavities of the one or more structures. The sensing modules may be a product mass-produced in quantities of one or more.

The sensing modules may have the same external dimensions but might have various kinds of strain gages designed for detecting different ranges of force applied to the structures containing the sensing modules, respectively.

The apparatus may further incorporate an electronics module. The electronics module may be connected to the one or more strain gages that translate the electrical resistance to an indication of the magnitude of the force applied on the structure.

A cavity may be a central axial hole having a bore. A sensing module may have a cylindrical shape that provides a fit of the sensing module in the bore. The fit of the sensing module may be where an external surface of the cylindrical shape of the sensing module is in contact with an internal surface of the bore sufficient to transfer a force of a load on the structure to the sensing module having one or more strain gages.

A sensing module may be a load pin element having a cylindrical shape. The load pin element may have one or more external grooves that define shear planes located between two or more forces being sensed by the sensing module having one or more strain gages.

The apparatus may further incorporate additional sensing modules having one or more strain gages, and incorporate additional structures. Virtually all of the sensing modules may have external dimensions that are uniform in magnitude. Virtually all of the structures may have cavities that are uniform in size. Any sensing module of virtually all of the sensing modules may have a fit in any cavity of each structure of virtually all of the structures. The fit of a sensing module may be where an external surface of a sensing module is in contact with an internal surface of a cavity sufficient to transfer a force of a load on the structure to the sensing module having one or more strain gages.

The one or more structures may have different external dimensions and shapes but can contain cavities that have uniform internal dimensions. The one or more sensing modules may have external dimensions that are virtually equal to the internal dimensions of each of the cavities of the structures such that a sensing module can closely fit into each cavity sufficient to transfer a force on a respective structure to the sensing module.

An approach, for determining strain on a structure, may incorporate providing a structure, making an opening in the structure, fabricating a strain gage module that has a fit in the opening, inserting the strain gage module in the opening, and securing the strain gage module in the opening to be rigidly attached to the structure. A force on the structure may result in a force on the strain gage module.

The approach may further incorporate providing one or more additional structures, each structure having an opening having the same size as an opening of another structure, and producing one or more additional strain gage modules having one external size that permits each strain gage to have the fit in each of the openings of the one or more structures. The one or more structures may differ from one another in external dimensions and shape.

The strain gage module may incorporate one or more strain gages that detect the force on the strain gage module. The force on the strain gage module may result in an output of a resistance representative of the force on the structure.

The approach may further incorporate connecting an electronics module to the one or more strain gages, and calibrating the electronics module so that an electric signal from the electronics module represents the force on the structure.

A modular load pin assembly may incorporate a strain gage module, and a structure, subject to tension or compression, having a place for insertion of the strain gage module such that tension or compression is transferred from the structure to the strain gage module. The strain gage module may be removable from the structure without physically altering the structure.

The place for insertion of the strain gage module may incorporate a hole for insertion of the strain gage module. The structure with the hole may be a sleeve within which the strain gage module is inserted.

The strain gage module may incorporate one or more strain gages that detect a tension or compression on the strain gage module. The one or more strain gages may have a resistance that indicates a magnitude of the tension or compression.

The assembly may further incorporate an electronics module situated in a place in the structure or outside of the structure. The electronics module may be connected to the one or more strain gages.

The strain gage module may have a cylindrical shape that has an outside diameter. The structure may have an opening having an inside diameter that is larger than the outside diameter of the strain gage module. The structure may have virtually any external shape.

The structure may be a pin. The strain gage module may be situated and secured in a hole at a center of the pin.

The strain gage module may be pressed into the opening of the structure, the strain gage module may be welded to the structure after insertion of the strain gage module in the opening of the structure, the strain gage module may be secured in the opening of the structure with a glue or other adhesive, or the strain gage module may be secured in the opening of the structure with a holding mechanism.

A holding mechanism may incorporate one or more set screws in the structure to hold the strain gage module in the hole, one or more pins in the structure and the strain gage module to hold the strain gage module in the hole, or a latch on the structure to hold the strain gage in the hole.

U.S. Pat. No. 7,644,636, issued Jan. 12, 2010, and entitled "Load Pin Brake Cell Apparatus", is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A modular apparatus having internal load sensing, comprising:
   one or more sensing modules having external surfaces with certain cross-section dimensions that are the same, and each sensor module comprises:
      one or more first portions with a first diameter;
      one or more second portions extending from one or more of the first portions, the one or more second portions having a second diameter greater than the first diameter;
      a sleeve defining the external surface, the sleeve is in mechanical contact with one or more of the second portions; and
      one or more strain gages within the sleeve; and
   one or more structures wherein each structure contains one or more cavities having internal surfaces with the certain cross-section dimensions to contain and hold the one or more sensing modules; and
   wherein:
   each structure of the one or more structures holds the one or more sensing modules in the cavity in a manner that permits effects of a force applied on the structure to be transferred to the strain gages or other instrumentation mounted to the one or more sensing modules;
   the force applied on a structure is detected by the one or more strain gages of the sensing module held by the structure; and
   the one or more strain gages have an electrical resistance that changes with a variation of a magnitude of the force applied to the structure.

2. The apparatus of claim 1, wherein the sensing modules have the same external dimensions but can have various kinds of strain gages designed for detecting different ranges of force applied to the structures containing the sensing modules, respectively.

3. The apparatus of claim 1, further comprising:
   an electronics module; and
   wherein the electronics module is connected to the one or more strain gages that translate the electrical resistance to an indication of the magnitude of the force applied on the structure.

4. The apparatus of claim 1, wherein:
   a cavity is a central axial hole having a bore;
   a sensing module has a cylindrical shape that provides a fit of the sensing module in the bore; and
   the fit of the sensing module is where an external surface of the cylindrical shape of the sensing module is in contact with an internal surface of the bore sufficient to transfer a force of a load on the structure to the sensing module having one or more strain gages.

5. The apparatus of claim 1, wherein:
   a sensing module is a load pin element with the sleeve having a cylindrical shape; and
   the load pin element has one or more external grooves that define shear planes located between two or more forces being sensed by the sensing module having one or more strain gages.

6. The apparatus of claim 1, further comprising:
   additional sensing modules comprising one or more strain gages; and
   additional structures; and
   wherein:
   virtually all of the sensing modules have external dimensions that are uniform in magnitude;
   virtually all of the structures have cavities that are uniform in size;
   any sensing module of virtually all of the sensing modules has a fit in any cavity of each structure of virtually all of the structures; and
   the fit of a sensing module is where an external surface of a sensing module is in contact with an internal surface of a cavity sufficient to transfer a force of a load on the structure to the sensing module having one or more strain gages.

7. The apparatus of claim 1, wherein:
   the one or more structures can have different external dimensions and shapes but contain cavities that have uniform internal dimensions; and
   the one or more sensing modules have external dimensions that are virtually equal to the internal dimensions of each of the cavities of the structures such that a sensing module can closely fit into each cavity sufficient to transfer a force on a respective structure to the sensing module.

8. A method for determining strain on a structure, comprising:
   providing a structure;
   making an opening in the structure;
   fabricating a strain gage module that has a fit in the opening; the strain gage module including:
      one or more first portions with a first diameter;
      one or more second portions extending from one or more of the first portions, the one or more second portions having a second diameter greater than the first diameter; and
      a sleeve defining the fit and having an inner surface in mechanical contact with one or more of the second portions; and
   inserting the strain gage module in the opening; and
   securing the strain gage module in the opening to be rigidly attached to the structure; and
   wherein a force on the structure results in a force on the strain gage module.

9. The method of claim 8, wherein fabricating a strain gage module that has a fit in the opening includes mass-producing the strain gage modules in quantities of one or more.

10. The method of claim 8, further comprising:
   providing one or more additional structures, each structure having an opening having the same size as an opening of another structure; and
   producing one or more additional strain gage modules having one external size that permits each strain gage to have the fit in each of the openings of the one or more structures; and
   wherein the one or more structures can differ from one another in external dimensions and shape.

11. The method of claim 8, wherein:
the strain gage module comprises one or more strain gages that detect the force on the strain gage module; and
the force on the strain gage module results in an output of a resistance representative of the force on the structure.

12. The method of claim 11, further comprising:
connecting an electronics module to the one or more strain gages; and
calibrating the electronics module so that an electric signal from the electronics module represents the force on the structure.

13. A modular load pin assembly comprising:
a strain gage module, the strain gage module comprising:
one or more first portions with a first diameter; and
one or more second portions extending from one or more of the first portions, the one or more second portions having a second diameter greater than the first diameter; and
a structure, subject to tension or compression, having a place for insertion of the strain gage module such that tension or compression is transferred from the structure to the strain gage module; and
wherein:
the strain gage module is removable from the structure without physically altering the structure;
the place for insertion of the strain gage module incorporates a hole for insertion of the strain gage module; and
the structure with the hole is a sleeve within which the strain gage module is inserted, one or more of the second portions of the inserted strain gage module are in mechanical contact with an inner surface of the sleeve.

14. The assembly of claim 13, wherein:
the strain gage module comprises one or more strain gages on one or more of the first portions, the one or more strain gages detect a tension or compression on the strain gage module; and
the one or more strain gages have a resistance that indicates a magnitude of the tension or compression.

15. The assembly of claim 14, further comprising:
an electronics module situated in a place in the structure; and
wherein the electronics module is connected to the one or more strain gages.

16. The assembly of claim 13, wherein:
the strain gage module has a cylindrical shape that has an outside diameter;
the structure has an opening having an inside diameter that is larger than the outside diameter of the strain gage module; and
the structure can have virtually any external shape.

17. The assembly of claim 13, wherein:
the structure is a pin; and
the strain gage module is situated and secured in a hole at a center of the pin.

18. The assembly of claim 16, wherein:
the strain gage module is pressed into the opening of the structure;
the strain gage module is welded to the structure after insertion of the strain gage module in the opening of the structure;
the strain gage module is secured in the opening of the structure with a glue; or
the strain gage module is secured in the opening of the structure with a holding mechanism.

19. The assembly of claim 18, wherein a holding mechanism comprises:
one or more set screws in the structure to hold the strain gage module in the hole;
one or more pins in the structure and the strain gage module to hold the strain gage module in the hole; or
a latch on the structure to hold the strain gage module in the hole.

* * * * *